US012136085B2

(12) United States Patent
Penney et al.

(10) Patent No.: US 12,136,085 B2
(45) Date of Patent: Nov. 5, 2024

(54) ON-DEMAND SECURE DATA ENTRY FOR REPRESENTATIVE-ASSISTED TRANSACTIONS

(71) Applicant: Broadsource Group Pty Ltd, Docklands (AU)

(72) Inventors: Russell Penney, Brunswick (AU); Haydn Faltyn, Melbourne (AU); Jason Thals, Brunswick (AU)

(*) Notice: Subject to any disclaimer, the term of this patent is extended or adjusted under 35 U.S.C. 154(b) by 0 days.

(21) Appl. No.: 18/070,463

(22) Filed: Nov. 28, 2022

(65) Prior Publication Data
US 2024/0086904 A1 Mar. 14, 2024

Related U.S. Application Data

(60) Provisional application No. 63/405,248, filed on Sep. 9, 2022.

(51) Int. Cl.
G06Q 20/38 (2012.01)
G06Q 20/02 (2012.01)
H04M 3/42 (2006.01)

(52) U.S. Cl.
CPC ..... *G06Q 20/38215* (2013.01); *G06Q 20/027* (2013.01); *H04M 3/42008* (2013.01); *G06Q 2220/00* (2013.01)

(58) Field of Classification Search
CPC ............................................... G06Q 20/38215
USPC ........................................................ 705/76
See application file for complete search history.

(56) References Cited

U.S. PATENT DOCUMENTS

| 6,256,515 | B1* | 7/2001 | Cox ...................... H04M 15/44 |
| | | | 455/445 |
| 8,831,204 | B1 | 9/2014 | Pycko et al. |
| 10,176,472 | B1* | 1/2019 | Peterson ................ G06Q 20/16 |
| 10,205,827 | B1 | 2/2019 | Pycko et al. |
| 10,587,753 | B1* | 3/2020 | Ravichandran .. H04N 21/44016 |
| 2004/0132433 | A1* | 7/2004 | Stern .................... H04M 3/4931 |
| | | | 455/410 |
| 2016/0014278 | A1* | 1/2016 | Defoort ................... H04L 63/08 |
| | | | 379/142.05 |
| 2016/0360038 | A1* | 12/2016 | Phelps ...................... H04L 5/14 |
| 2018/0137295 | A1* | 5/2018 | Sharma ................. G06F 21/606 |
| 2020/0169636 | A1* | 5/2020 | Hillier ................. H04L 65/1096 |
| 2023/0156125 | A1* | 5/2023 | Agarwal ................. H04M 3/58 |
| | | | 379/212.01 |

* cited by examiner

Primary Examiner — Chinedu C Agwumezie
(74) Attorney, Agent, or Firm — Boon Intellectual Property Law, PLLC; Brian S. Boon

(57) ABSTRACT

An on-demand secure data entry system and method for representative-assisted transactions that allows for a representative to be present on a call during the entry of private information to assist the customer while still preventing exposure of the private information to the representative. The system and method involve placing an existing call between a representative and customer on hold, creating a secure call "secure call platform," placing and parking separate calls secured by the secure call platform from the system to the representative and from the system to the customer, bridging the separate calls such that the representative and customer are connected through the calls secured by the secure call platform, and then masking portions of information received on the system-to-customer call from information transmitted to the system-to-representative call.

10 Claims, 17 Drawing Sheets

ON-DEMAND SECURE DATA ENTRY FOR REPRESENTATIVE-ASSISTED TRANSACTIONS

CROSS-REFERENCE TO RELATED APPLICATIONS

Priority is claimed in the application data sheet to the following patents or patent applications, the entire written description of each of which is expressly incorporated herein by reference in its entirety:
63/405,248

BACKGROUND

Field of the Art

The disclosure relates to the field of computer data security, and more particularly to the field of secure data entry during representative-assisted transactions.

Discussion of the State of the Art

In the field of representative-assisted calls (e.g., call centers, technical support, online payments for merchants, etc.), data security is an important consideration. One aspect of data security involves representatives having access to the private information of customers such as account numbers, credit card numbers, and passwords. Preventing representatives from seeing or hearing the private information is one way to ensure data security when customers transmit private data during a conversation with a representative.

During phone calls with representatives, for example, it may be necessary for the representative to request private information from a customer for purposes of assisting the customer. Typically, this involves having the customer speak the private information verbally to the representative, which is less secure in that it involves exposing the private information directly to the representative. Where the customer enters the private information using a touch-tone phone via dual-tone multi-frequency (DTMF), the representative could hear and decode the tones to obtain the private information. Existing technologies for securing such calls either require the entire merchant transaction system to be secured for all calls at all time or require that the customer be transferred to a different system where the representative of the merchant is not present to assist the customer.

What is needed is a means for allowing a representative to be present on a call during the entry of private information to assist the customer while still preventing exposure of the private information to the representative.

SUMMARY

Accordingly, the inventor has conceived and reduced to practice, an on-demand secure data entry system and method for representative-assisted transactions that allows for a representative to be present on a call during the entry of private information to assist the customer while still preventing exposure of the private information to the representative. The system and method involve placing an existing call between a representative and customer on hold, creating a secure call "secure call platform," placing and parking separate calls secured by the secure call platform from the system to the representative and from the system to the customer, bridging the separate calls such that the representative and customer are connected through the calls secured by the secure call platform, and then masking portions of information received on the system-to-customer call from information transmitted to the system-to-representative call. In some embodiments, this process is performed via a unified communications (UC) system. In some embodiments, the masked information is dual-tone multi-frequency (DTMF) tones entered by the customer and received on the system-to-customer call.

According to a preferred embodiment, a system for on-demand secure data entry for representative-assisted calls is disclosed, comprising: a computing device comprising a memory, a processor, and a non-volatile data storage device; a dialed number identification service (DNIS) pool stored on the non-volatile data storage device, the DNIS pool comprising one or more phone numbers; a session worker comprising a first plurality of programming instructions stored in the memory which, when operating on the processor, causes the computing device to: receive a command associated with a customer-to-representative call on a telephony system, the command comprising a request to establish a secured, bridged call, a customer phone number for the customer-to-representative call, and a representative phone number for the customer-to-representative call; request a phone number allocation from the DNIS pool from a dialed number identification service (DNIS) pool worker; receive an allocated phone number from the DNIS pool by the DNIS pool worker; instruct the telephony system to place the customer-to-representative call on hold; instruct the telephony system to place a system-to-customer call from the allocated phone number to the customer phone number; instruct a dual-tone multi-frequency (DTMF) secure call platform to park the system-to-customer call after placement; request and receive validation of the system-to-customer call from the DNIS pool worker; instruct the DTMF secure call platform to secure the system-to-customer call after receipt of validation of the system-to-customer call; instruct the telephony system to place a system-to-representative call from the allocated phone number to the representative phone number; instruct the DTMF secure call platform to park the system-to-representative call after placement; request and receive validation of the system-to-representative call from the DNIS pool worker; instruct the DTMF secure call platform to secure the system-to-representative call after receipt of validation of the system-to-representative call; and instruct the DTMF secure call platform to bridge the system-to-customer call and the system-to-representative call via the allocated phone number; a dual-tone multi-frequency (DTMF) secure call platform comprising a second plurality of programming instructions stored in the memory which, when operating on the processor, causes the computing device to: park the system-to-customer call; secure the system-to-customer call; park the system-to-representative call; secure the system-to-representative call after receipt of validation of the system-to-representative call; bridge the system-to-customer call and the system-to-representative call via the allocated phone number; receive one or more dual-tone multi-frequency (DTMF) tones representing digits from zero to nine from the system-to-customer call; block transmission of the DTMF tones to the system-to-representative call while passing through any other audio from the system-to-customer call to the system-to-representative call; and the DNIS pool worker comprising a third plurality of programming instructions stored in the memory which, when operating on the processor, causes the computing device to: allocate a phone number from the DNIS pool; validate the system-to-customer call; and validate the system-to-representative call.

According to another preferred embodiment, a method for on-demand secure data entry for representative-assisted calls is disclosed, comprising the steps of: storing a dialed number identification service (DNIS) pool stored on a non-volatile data storage device of a computing device comprising a memory, a processor, and the non-volatile data storage device, the DNIS pool comprising one or more phone numbers; using a session worker operating on the computing device to: receive a command associated with a customer-to-representative call on a telephony system, the command comprising a request to establish a secured, bridged call, a customer phone number for the customer-to-representative call, and a representative phone number for the customer-to-representative call; request a phone number allocation from the DNIS pool from a dialed number identification service (DNIS) pool worker operating on the computing device; receive an allocated phone number from the DNIS pool by the DNIS pool worker; instruct the telephony system to place the customer-to-representative call on hold; instruct the telephony system to place a system-to-customer call from the allocated phone number to the customer phone number; instruct a dual-tone multi-frequency (DTMF) secure call platform operating on the computing device to park the system-to-customer call after placement; request and receive validation of the system-to-customer call from the DNIS pool worker; instruct the DTMF secure call platform to secure the system-to-customer call after receipt of validation of the system-to-customer call; instruct the telephony system to place a system-to-representative call from the allocated phone number to the representative phone number; instruct the DTMF secure call platform to park the system-to-representative call after placement; request and receive validation of the system-to-representative call from the DNIS pool worker; instruct the DTMF secure call platform to secure the system-to-representative call after receipt of validation of the system-to-representative call; and instruct the DTMF secure call platform to bridge the system-to-customer call and the system-to-representative call via the allocated phone number; using the dual-tone multi-frequency (DTMF) secure call platform to: park the system-to-customer call; secure the system-to-customer call; park the system-to-representative call; secure the system-to-representative call after receipt of validation of the system-to-representative call; bridge the system-to-customer call and the system-to-representative call via the allocated phone number; receive one or more dual-tone multi-frequency (DTMF) tones representing digits from zero to nine from the system-to-customer call; block transmission of the DTMF tones to the system-to-representative call while passing through any other audio from the system-to-customer call to the system-to-representative call; and using the DNIS pool worker to: allocate a phone number from the DNIS pool; validate the system-to-customer call; and validate the system-to-representative call.

According to an aspect of an embodiment, the DTMF secure call platform is further configured to: decrypt the received DTMF tones into the digits they represent; add the digits to a field; and transmit the field to a payment worker for processing by a secure payment application.

According to an aspect of an embodiment, the DTMF secure call platform is further configured to: mask one or more of the digits in the field; and transmit the field with the masked digits to a representative interface via the system-to-representative call.

According to an aspect of an embodiment, the representative interface operating on a second computing device is configured to receive and display the field with the masked digits.

According to an aspect of an embodiment, a secure border controller (SBC) operating on the computing device acts as a call gateway securing a payment card industry (PCI) compliant zone, and the DTMF secure call platform and secure payment application operate within the PCI compliant zone.

According to an aspect of an embodiment, a messaging broker operating on the computing device is used to manage communications among the session worker, the DTMF secure call platform, and the DNIS pool worker.

According to an aspect of an embodiment, a softswitch operating on the computing device is used for the placement of the system-to-customer call, the placement of the system-to-representative call, and the bridging of the system-to-customer call with the system-to-representative call are performed using the softswitch.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
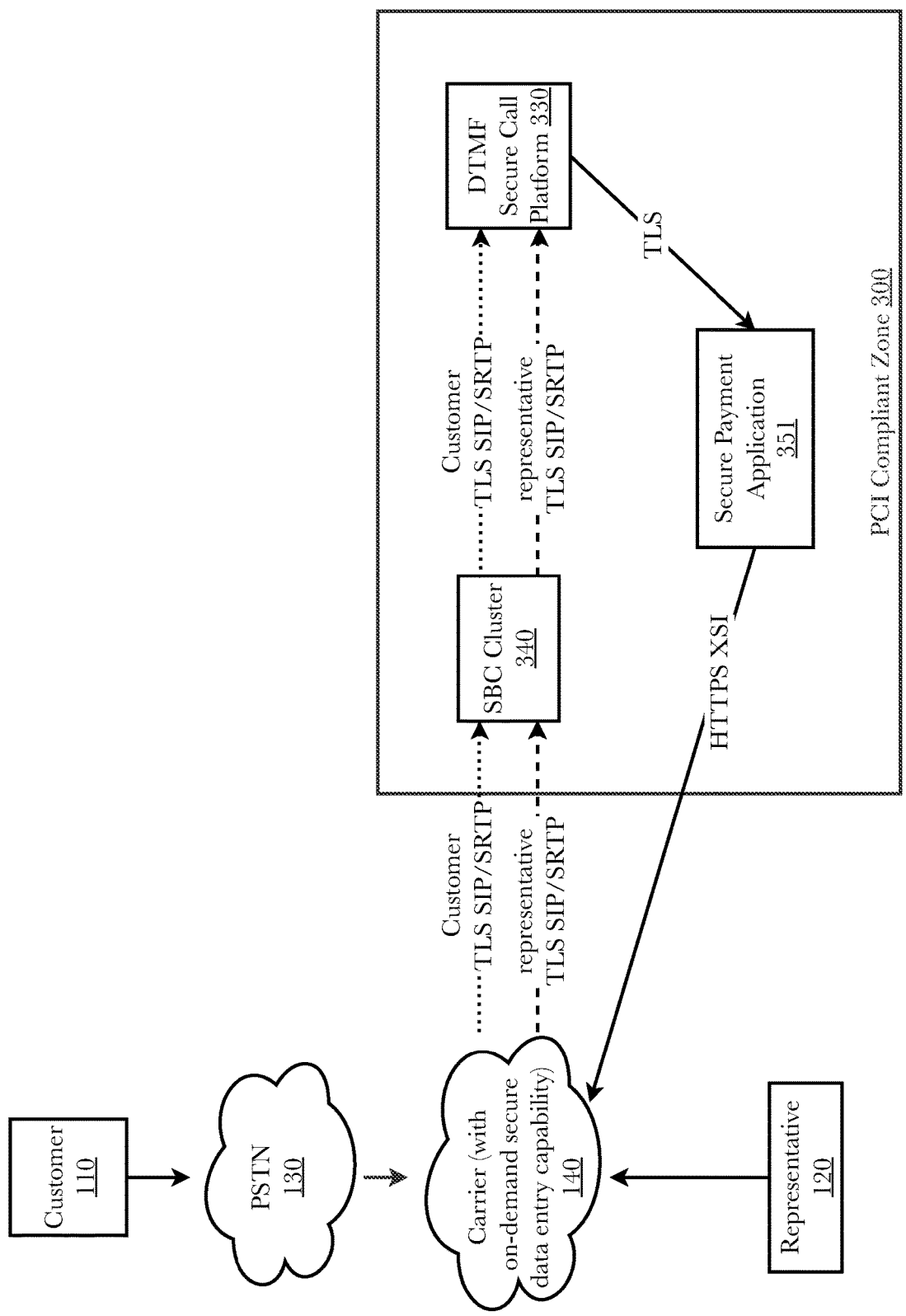
FIG. 1 is a block diagram illustrating exemplary operation of a secure call platform in an payment card industry compliance configuration.

The inventor has conceived, and reduced to practice, an on-demand secure data entry system and method for representative-assisted transactions that allows for a representative to be present on a call during the entry of private information to assist the customer while still preventing exposure of the private information to the representative. The system and method involve placing an existing call between a representative and customer on hold, establishing a secure call "secure call platform," placing and parking separate calls secured by the secure call platform from the system to the representative and from the system to the customer, bridging the separate calls such that the representative and customer are connected through the calls secured by the secure call platform, and then masking portions of information received on the system-to-customer call from information transmitted to the system-to-representative call. In some embodiments, this process is performed via a unified communications (UC) system. In some embodiments, the masked information is dual-tone multi-frequency (DTMF) tones entered by the customer and received on the system-to-customer call.

A primary use case for the secure data entry system and method herein described is for facilitation of customer payments to merchants via a representative of the merchant. It allows for businesses to securely take credit card based payments using a Unified Communications as a Service (UCaaS) extension in office settings, service desk and retail point of sale transactions. UCaaS is the modern form of the modern form of the plain old telephone service (POTS) and allows for software-based call handling as described herein. The application of the system and method herein described allow for new, just-in-time business processes that make customer-merchant transactions faster and more efficient while simultaneously improving data security.

The on-demand secure data entry solution works by moving an existing customer-to-representative call to a secure call "secure call platform." The secure call platform is a software module that secures real-time communication (RTC) connections and, depending on configuration, filters audio and/or data from the connection prior to transmitting it elsewhere. The secure call platform is established by using third-party call control features in defined steps to make separate system-to-customer and system-to-representative call legs, place those separate call legs onto the secure call platform, and then bridging the calls internally (e.g., within a unified communications (UC) telephony system). After bridging, the customer and representative can talk to each other as usual, but with the added functionality of capturing private information from the system-to-customer leg and masking it from the system-to-representative leg. As one example, if the customer enters DTMF tones on his or her touchtone keypad, the DTMF audio tones and their decryptions into digits can be received by the system and acted upon (e.g., inserted into appropriate fields) while masking that information from the representative. In some embodiments, once the call is bridged via the secure call platform, it will remain bridged until it ends, although in other embodiments the bridged calls can be disconnected and the original call removed from hold such that the customer and representative continue to converse on the original call.

Using third-party call control is convenient in that it allows the on-demand secure data entry solution to work on most class 5 switches. Pluggable software interfaces can be used to abstract the switch-dependent integration details.

The on-demand secure data entry solution described herein supports configurable payment gateways (also known as secure payment applications) to allow collection of credit card information along with other details like amount, card holder name and reference, all of which can be submitted to a configurable payment gateway for a representative to perform the card payment using masked or partially-masked information.

In some embodiments, the on-demand secure data entry solution is operated by a representative using a user interface (which enables the representative to secure the call. This user interface can be configured to run on any compatible platform, a non-limiting list of which includes running stand-alone in a browser, embedded in another webpage, or displayed on a telephony device with an appropriate screen.

In some embodiments, the on-demand secure data entry solution also supports application programming interfaces (APIs). Use of the on-demand secure data entry solution via APIs allows organisations using the solution to incorporate the securing functionality into their existing systems without major changes to their existing systems.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Representative" as used herein means a representative of an organization whose job it is to assist customers via remote communications such as phone, text, or chat. A representative as herein defined includes, but is not limited to, salespeople, administrators, receptionists, payment processors, and other persons who may be involved in assisting customers via remote communications, whether paid or unpaid, whether working for an organization receiving payment or for a third party, and regardless of employer-employee relationships.

"Secure call platform" or "SCP" as used herein means a software component that receives and processes softswitch events to secure real-time communication (RTC) connections and, depending on configuration, filter audio and/or data from the connection prior to transmitting it elsewhere.

"Customer" as used herein means a person requiring assistance via remote communications. A customer may be purchaser or user of the goods and/or services of an organization, but the term as used herein is not so limited, and may include callers seeking assistance from non-profits, helplines, technical support lines, and other sources whether paid or unpaid.

"Phone number" as used herein means any sequence of numerical digits that can be dialed by a telephony system in order to connect to a device associated with the sequence of numerical digits dialed. The term "phone number" includes but is not limited to local numbers, national numbers, international numbers, numbers external to a PBX or UC system, and numbers internal to a PBX or UC system, whether or not having an international calling code or country code, a prefix or area code, or a suffix or extension, and whether or not consisting only of a suffix or extension (such as internally to a PBX or UC system).

"Private Branch Exchange" or "PBX" as used herein means a telephone system within an organization that switches calls between users on local lines while enabling all users to share a certain number of external phone lines. Modern PBX systems are capable of converting analog signals from plain old telephone services (POTS) to digital signals, and often include network switching capabilities that allow use of analog phones with the organization's digital PBX system.

"Unified Communications" as used herein means integration of different types of communications tools such as PSTN audio calls, VOIP audio calls, video calls, email, voice mail, text messaging.

"Unified Communications Telephony System" or "Unified Communications System" as used herein means a communications system that allows for or provides unified communications.

Conceptual Architecture

FIG. 1 is a block diagram illustrating exemplary operation of a secure call platform in an payment card industry compliance configuration. In this example, a customer 110 calls a merchant via a public switching telephone network (PSTN) 130. The customer call is received by a carrier 140 which uses a unified communications (UC) telephony system. A representative 120 is connected to customer's call via carrier 140 at which point customer 110 and representative 120 can converse.

If secure communications are required, for example when representative 120 requests payment information from customer 110 to make a payment for goods or services, representative 120 clicks a button on the screen to secure communications. This starts a process of securing the call via a secure call platform which allows customer 110 to enter data in a secure manner which is masked from representative 120 even while representative remains on the call and available to speak with customer 110. Two new calls are made from an on-demand secure data entry system using carrier's 140 PBX or UC system, one from carrier 140 to customer and another from carrier 140 to representative 120. The new calls are passed as session initiation protocol (SIP) calls to a session broader controller (SBC) 340 residing within a payment card industry (PCI) compliant zone 300. SBC passes the calls to a DTMF secure call platform 330, which secures the calls, bridges them, and masks DTMF tones and decryptions entered by customer 110 from representative 120 while passing through other audio to representative 120, allowing customer 110 and representative 120 to continue conversing while customer enters DTMF tones (e.g., credit card numbers). Data entered by customer 110 using DTMF tones may be displayed to representative in masked or partially masked form (e.g., with asterisks in place of some or all of the decrypted DTMF digits). After customer's data has been entered, representative may submit the information for payment to a secure payment application 351 which places the payment via an Internet connection through carrier 140.

Note that while the customer call is shown in this example as being placed on a regular phone line via a PSTN, no limitation is implied thereby, and the call may be placed through other available means or technologies (e.g., voice-over-Internet-protocol (VOIP), cellular phone service, etc.).

Figure 2:
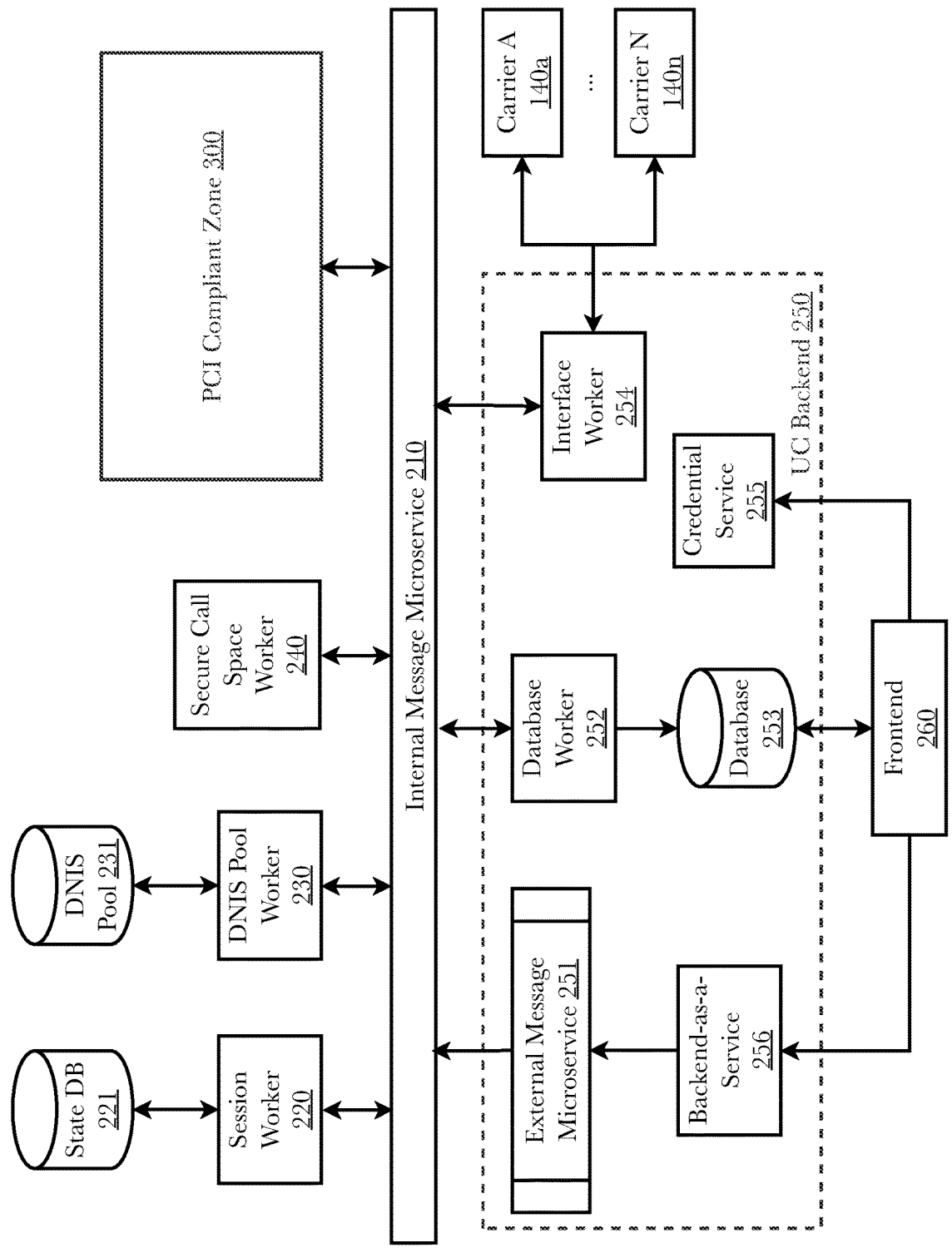
FIG. 2 is a block diagram illustrating an exemplary system architecture for an on-demand secure data entry system.

FIG. 2 is a block diagram illustrating an exemplary system architecture for an on-demand secure data entry system. In this embodiment, the backbone of the system is an internal messaging microservice 210 through which are passed messages from various workers, each having functionality that implements a portion of the system and directs and controls other components of the system. Internal messaging microservice 210 can be managed by one of several available messaging brokers such as Rabbit MQ™. The various workers comprise a session worker 220 a dialed number identification service (DNIS) worker 230, a secure call platform worker 240, a database worker 252, and an interface worker 257.

Session worker 220 is responsible for management of the overall process of receiving an original call, placing it on hold, establishing a secure call platform, placing new calls, and bridging the new calls. Service worker 220 may store information about the state of the process in a state database 221.

DNIS pool worker 230 is responsible for making dialed number identification service (DNIS) allocations for incoming calls, thereby allowing an organization's PBX or UC system to identify the number from which a call is being made and any DTMF tones associated with that number for use in capturing data. DNIS pool worker 230 may have access to a DNIS pool database 231 which stores a list of numbers dialable from the organization for whom the representative is working.

Secure call platform worker 240 is responsible for management of secure call platforms to secure calls, bridge calls, and mask private information received such as private information in the form of DTMF tones.

A unified communications (UC) backend 250 implements calls and call management instructions from session worker 220, DNIS pool worker 230, and secure call platform worker 240. UC backend 250 of this embodiment comprises an external message microservice 251, a database worker 252, a database 253, an interface worker 254, cloud functionality 256, and a credential service 255. External message microservice 251 operates in a manner similar to internal message microservice 210, but for messages with external entities or services. External message microservice 251 can be managed by one of several available messaging brokers such as Rabbit MQ™. Database worker 252 manages a cloud-based database service 253 used to store information such as user profiles, telephony information, and payment gateway information. An example of a cloud-based database service manageable by database worker 252 is Google Firestore™. Backend-as-a-service 256 provides cloud-based, scalable, cross-platform backend services via application programming interfaces (APIs) such as database management, cloud storage, user authentication, push notifications, and web hosting. Interface worker 254 receives and places calls through various carriers 140a-n pursuant to instructions from session worker 220.

A frontend 260 provides representatives with an interface for accessing and using the system, including an interface for implementing secure call platforms during a call.

In operation, when representative 120 asks for a call to be secured, DNIS pool worker 230 temporarily allocates a number from a DNIS pool 231. Session worker 220 then directs both the customer leg and the representative leg via the allocated number to a softswitch instance managed by interface worker 254. After validation and securing of the customer leg and representative leg calls, the calls are bridged allowing customer and representative to speak while intercepting and masking from representative any DTMF tones entered by customer.

DNIS pool 231 is a list of phone numbers that are dialable from the representative's phone service. They can be full national numbers or internal extensions. They can be routable internally via a softswitch on the representative's end or via the PSTN 130. In order to bridge the call legs, the number presented to the softswitch should be the same as the number used to dial the call to the secure call platform for each leg. The number presented to the softswitch is used to confirm that the number allocated from DNIS pool is correct and active, and to bridge the two call legs in a session. This procedure may be modified in cases where there is a routing prefix required to get the call out of a trunk line to the secure call platform. Each organization using the on-demand secure data entry system would likely have its own pool of numbers.

DNIS pool 231 acts as a security measure in that only numbers from the pool will be recognized by the system as valid. In some embodiments, the quantity of numbers available in the DNIS pool 231 may be dependent on the call volume of the organization and the security level needed. A larger DNIS pool 231 or a DNIS pool 231 containing randomly-selected numbers is more secure because attackers will have to guess more digits of the number (e.g., when the pool contains numbers with different prefixes versus numbers with the same prefix) so has a smaller chance of being able to dial a number in the pool which would be recognized as a valid call. If the numbers are not dialable externally then that also increases the security as they cannot be obtained outside of the system, and may allow a smaller quantity of numbers to be used with equivalent security.

Random allocation of numbers from DNIS pool 231 will enhance security. A further security enhancement is setting a time limit on the validity of the number selected from the pool, after which that number will no longer be recognized as valid. This allows a finite set of numbers to be used and re-used while still providing an acceptable level of security. Ideally, the amount of time a number can be allocated for should be the shortest time needed to reliably connect both customer and representative calls to the secure call platform. If a call comes in with a valid number but after the expiration of the time limit, the call may be rejected, and an alarm may be raised. Using these procedures would require an attacker to guess a number from the pool and dial it within the time limit in order to join a call either as customer or representative. In either case, however, this could not cause a PCI breach as the attacker would either replace the customer (in which case the customer's private information is not available) or would replace the representative (in which case the DTMF tones from the customer would be masked).

Once a number has been selected from DNIS pool 231, a series of instructions are orchestrated by the session worker 220 to establish a secured, bridged call between customer and representative as further described below.

Figure 3:
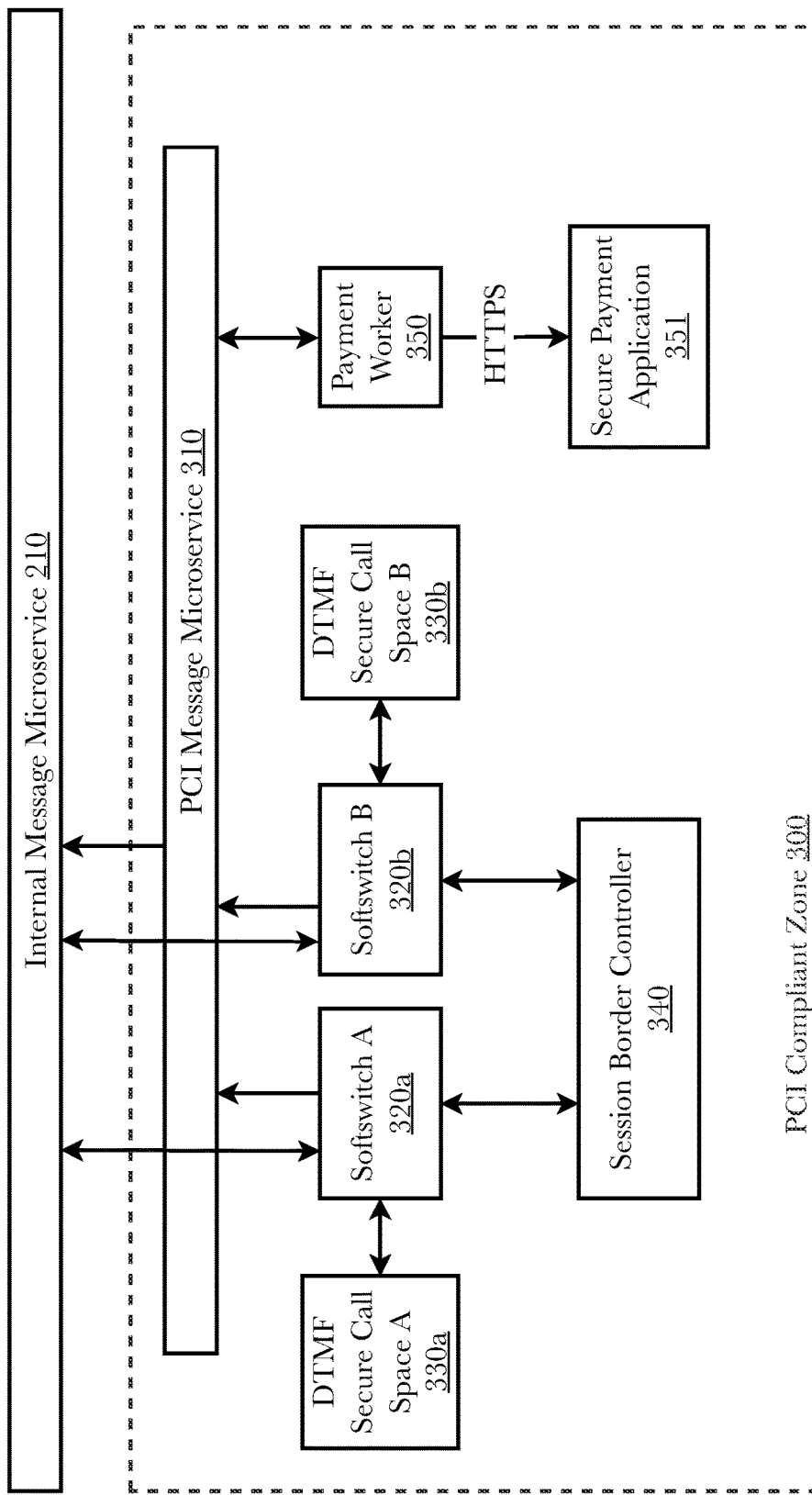
FIG. 3 is a block diagram illustrating details of exemplary payment card industry compliance zone aspect of an on-demand secure data entry system.

FIG. 3 is a block diagram illustrating details of exemplary payment card industry compliance zone aspect of an on-demand secure data entry system. When representative 120 requests that a call be secured, session worker 220 directs system-to-customer and system-to-representative calls to be made via softswitches 320a, b within a payment card industry (PCI) compliant zone. A PCI compliant zone is one that meets a set of security standards designed to ensure that all entities involved receive, process, store, and transmit credit card information in a secure environment. The operation of PCI compliant zone 300 is handled through a PCI message microservice 310 which operates in a manner similar to internal message microservice 210, but for messages within PCI compliant zone 300. PCI message microservice 310 can be managed by one of several available messaging brokers such as Rabbit MQ™. When calls are secured in a secure call platform and bridged messages are passed to PCI message microservice 310 to notify session worker 220 of their status. As used in this application, the phrases "system-to-customer" and "system-to-representative" are not intended to imply a directionality with which the call must be made, but rather to specify the end points of each call leg.

Session worker 220 directs UC backend 250 to place the existing customer-to-representative call on hold. Once the existing call has been placed on hold, session worker 220 directly UC backend 250 to establish a system-to-customer call (call A) through softswitch A 320a for which a DMTF secure call platform A is established 330a. Once call A has been established and parked, session worker 220 then directs UC backend 250 to establish a system-to-representative call (call B) through softswitch B 320b for which a DMTF secure call platform B is established 330b. Once call B has been established and parked, session worker 220 directs UC backend to bridge call A and call B to re-establish communications between customer and representative wherein voice audio is passed between customer and representative, but any DTMF tones entered by customer are masked from representative.

Session Border Controller (SBC) 340 is responsible for securing VOIP calls within PCI compliant zone 300 border and for directing telephony sessions from carriers to the appropriate softswitches for securing and bridging.

After secured, bridged calls have been established and customer has entered payment information via DTMF, payment worker 350 receives payment information fields from DTMF secure call platform via PCI message microservice 310 to process payments requested by representative. Payment worker 350 processes the payment via a secure payment application 351 via an Internet connection.

DETAILED DESCRIPTION OF EXEMPLARY ASPECTS

Figure 4A:
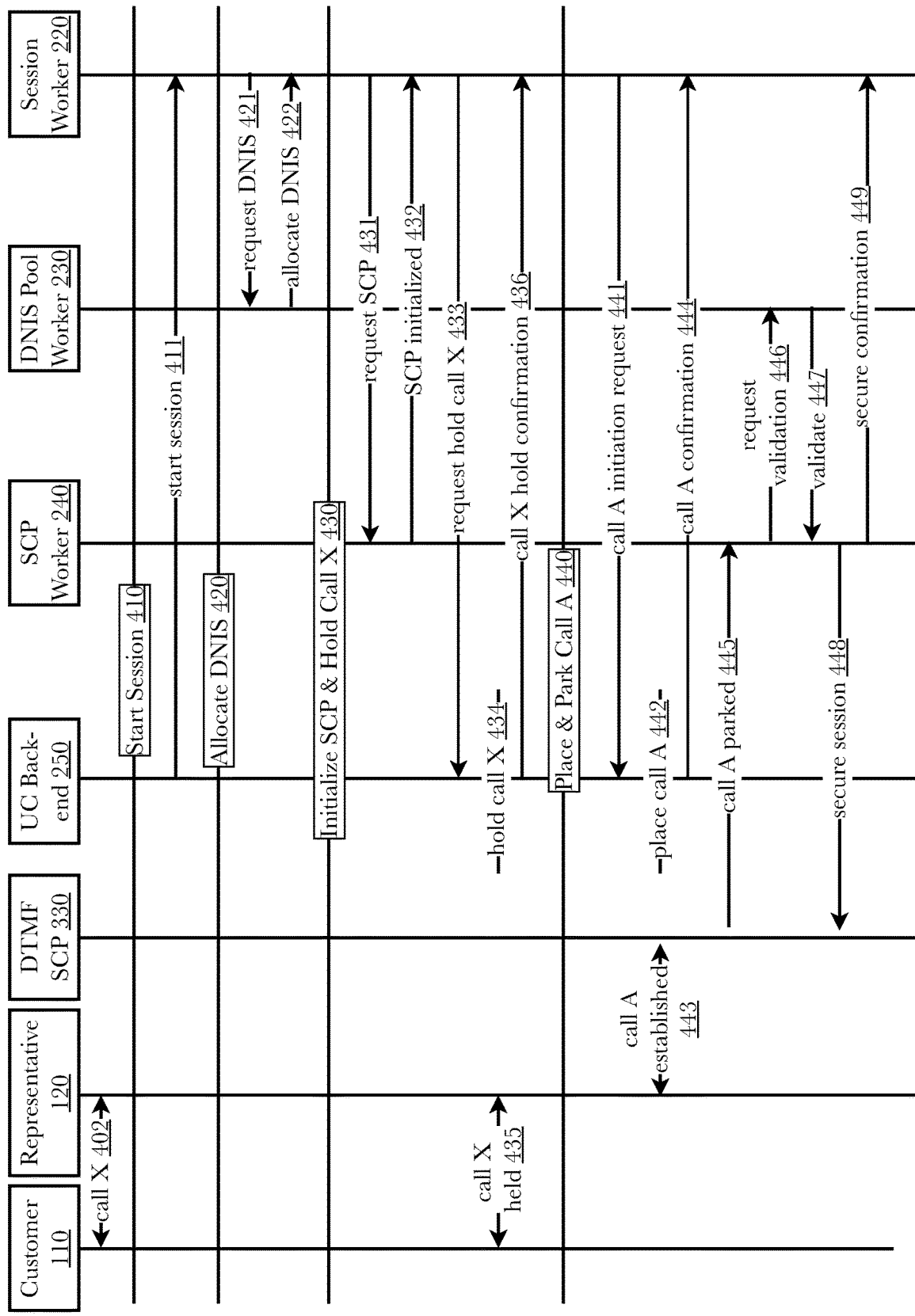
FIGS. 4A & 4B are a messaging diagram illustrating an exemplary messaging sequence for establishing a secured call space bridged call for secure data entry.
Figure 4B:
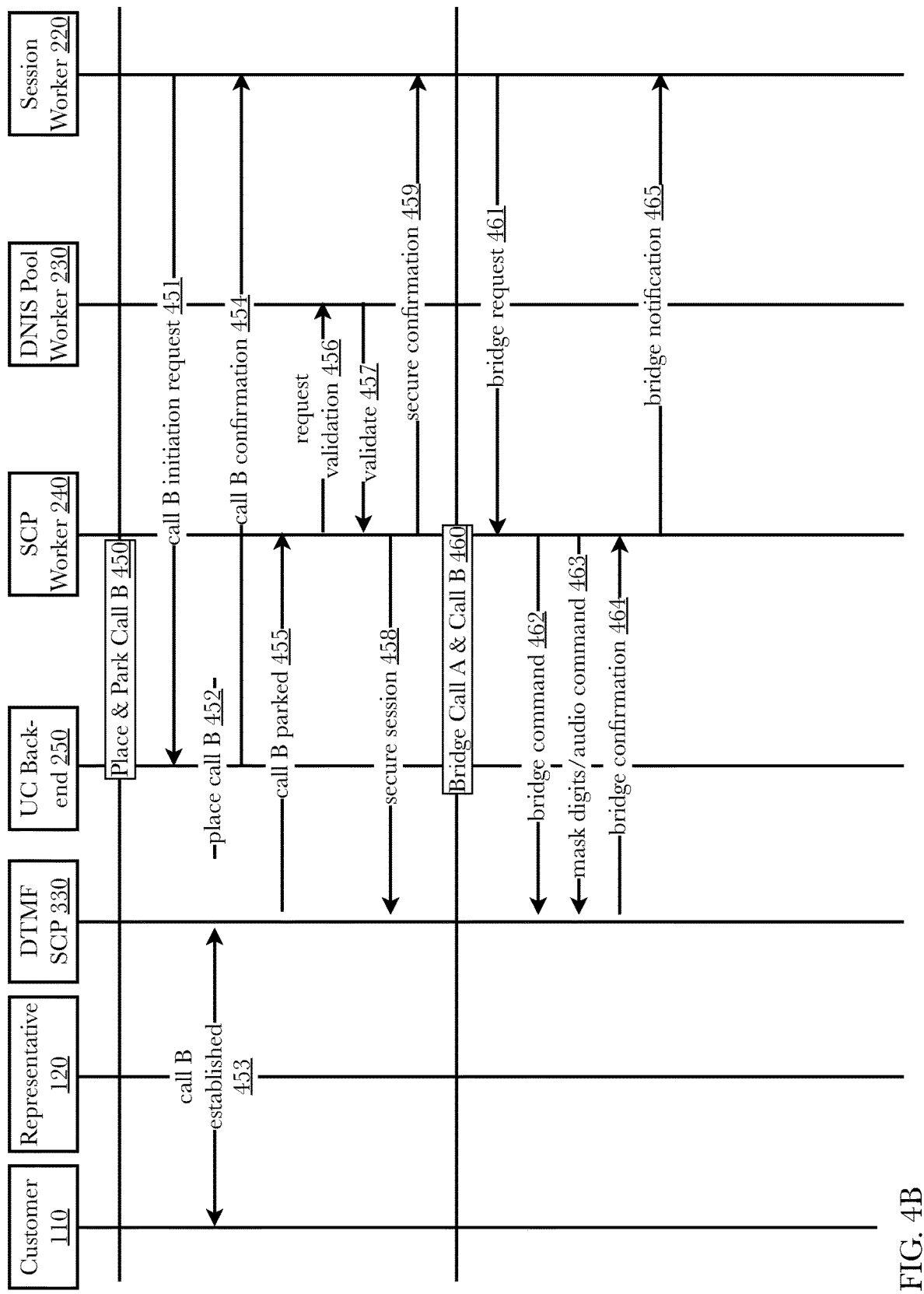

FIGS. 4A & 4B are a messaging diagram illustrating an exemplary messaging sequence for establishing a secured, bridged call for secure data entry. During a customer call (call X) with a representative 402, representative initiates a secure data entry session via his or her interface (e.g., by clicking on a "secure connection" button). A new session is started 410 when the UC backend 250 directs session worker 220 to start a session 411. A DNIS number is allocated 420 when session worker 220 requests a DNIS allocation 421 from DNIS pool worker 230, which responds by allocating a DNIS number 422. A secure call platform is initialized and call X is placed on hold 430 when session worker 220 requests establishment of a secure call platform 431 from secure call platform worker 240, which sends confirmation of secure call platform initialization 432 to session worker 220. Session worker 220 then sends a request to UC backend 250 to place call X on hold 433. Call X is held 435 when placed on hold 434 by UC backend 250, which then sends a hold confirmation 436 to session worker 220. System-to-representative call (call A) is placed and parked 440 when session worker 220 sends a call initiation request 441 to UC backend 250. Call A is established 443 between DTMF secure call platform 330 and representative 120 when the call is placed by UC backend 442, which sends confirmation of the call A placement 444 to session worker 220. DTMF secure call platform parks call A and sends notification that call A is parked 445 to secure call platform worker 240. Secure call platform worker 240 requests validation of call A 446 from DNIS pool worker 230, which responds by sending a validation 447 to secure call platform worker 240. Secure call platform worker 240 secures the session 448 via DTMF secure call platform 330 and sends a confirmation that the session has been secured 449 to session worker 220. System-to-customer call (call B) is placed and parked 450 when session worker 220 sends a call initiation request 451 to UC backend 250. Call B is established 453 between DTMF secure call platform 330 and representative 120 when the call is placed by UC backend 452, which sends confirmation of the call B placement 454 to session worker 220. DTMF secure call platform parks call B and sends notification that call B is parked 455 to secure call platform worker 240. Secure call platform worker 240 requests validation of call B 456 from DNIS pool worker 230, which responds by sending a validation 457 to secure call platform worker 240. Secure call platform worker 240 secures the session 458 via DTMF secure call platform 330 and sends a confirmation that the session has been secured 459 to session worker 220. Call A and call B are bridged 460 when session worker 220 sends a bridge request 461 to secure call platform worker 240, which sends a bridge command 462 and a mask digits/mask audio command 463 to DTMF secure call platform 330. DTMF secure call platform 330 responds with a bridge confirmation 464 and secure call platform worker 240 sends a notification of the bridge 465 to session worker 220.

Figure 5:
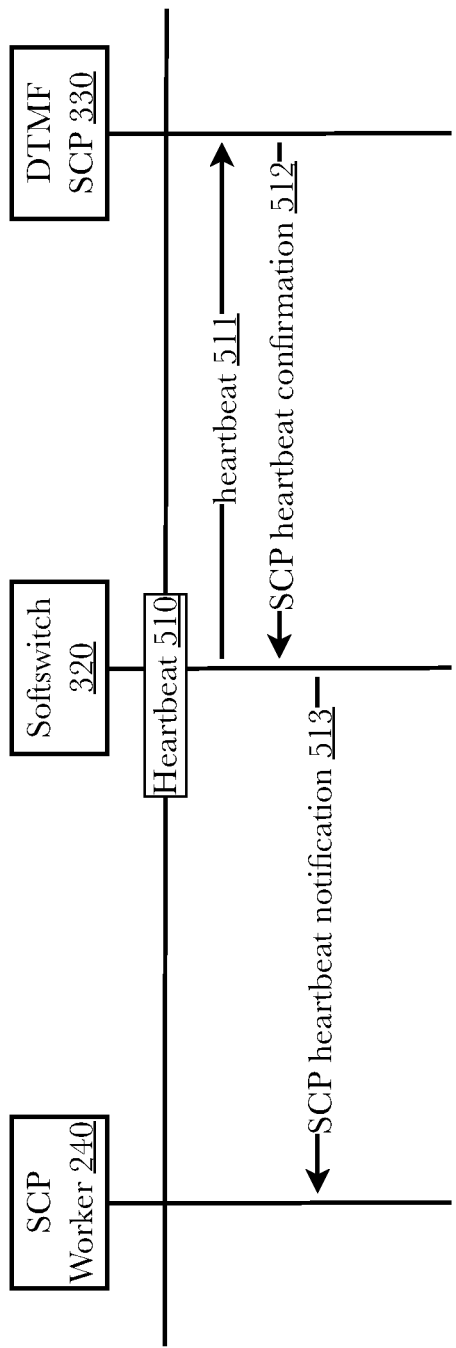
FIG. 5 is a messaging diagram illustrating an exemplary messaging sequence for confirming a state of a secure call platform for a secure data entry system.

FIG. 5 is a messaging diagram illustrating an exemplary messaging sequence for confirming a state of a secure call platform for a secure data entry system. A heartbeat confirmation sequence 510 is initiated during each heartbeat of a server operating a softswitch 320. Softswitch 320 sends a heartbeat event 511 to DTMF secure call platform 330, which responds by confirming the state of the secure call platform during that heartbeat 512. Softswitch 320 sends a secure call platform heartbeat notification 513 to secure call platform worker 240.

Figure 6:
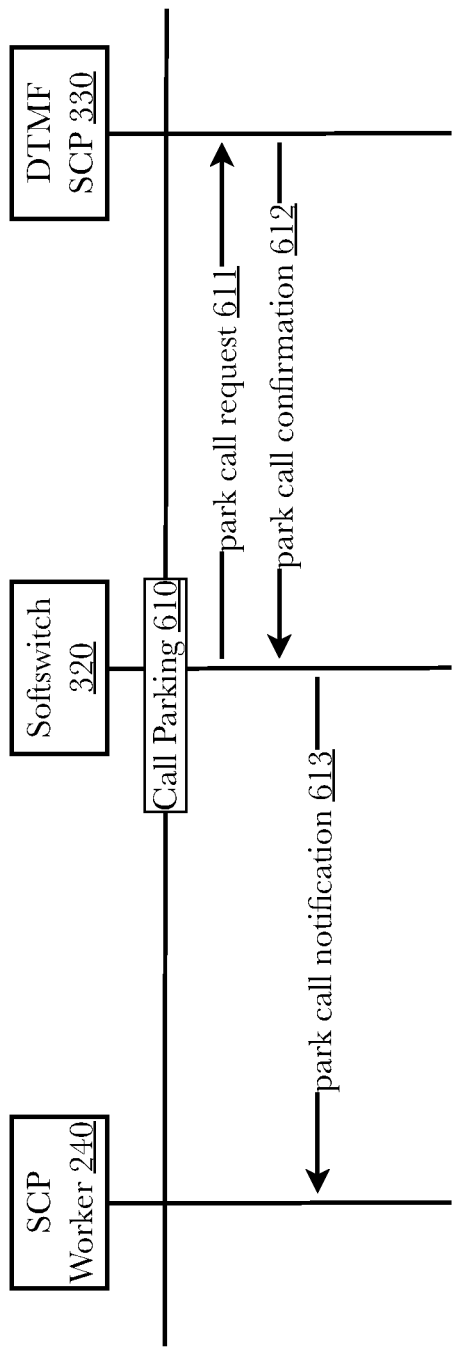
FIG. 6 is a messaging diagram illustrating an exemplary messaging sequence for parking a call prior to bridging calls for a secure data entry system.

FIG. 6 is a messaging diagram illustrating an exemplary messaging sequence for parking a call prior to bridging calls for a secure data entry system. A call parking sequence 610 is initiated when softswitch 320 sends a park call event 611 to DTMF secure call platform 330, which responds by parking the call and sending a parked call confirmation to softswitch 612. Softswitch 320 sends a parked call notification 613 to secure call platform worker 240.

Figure 7:
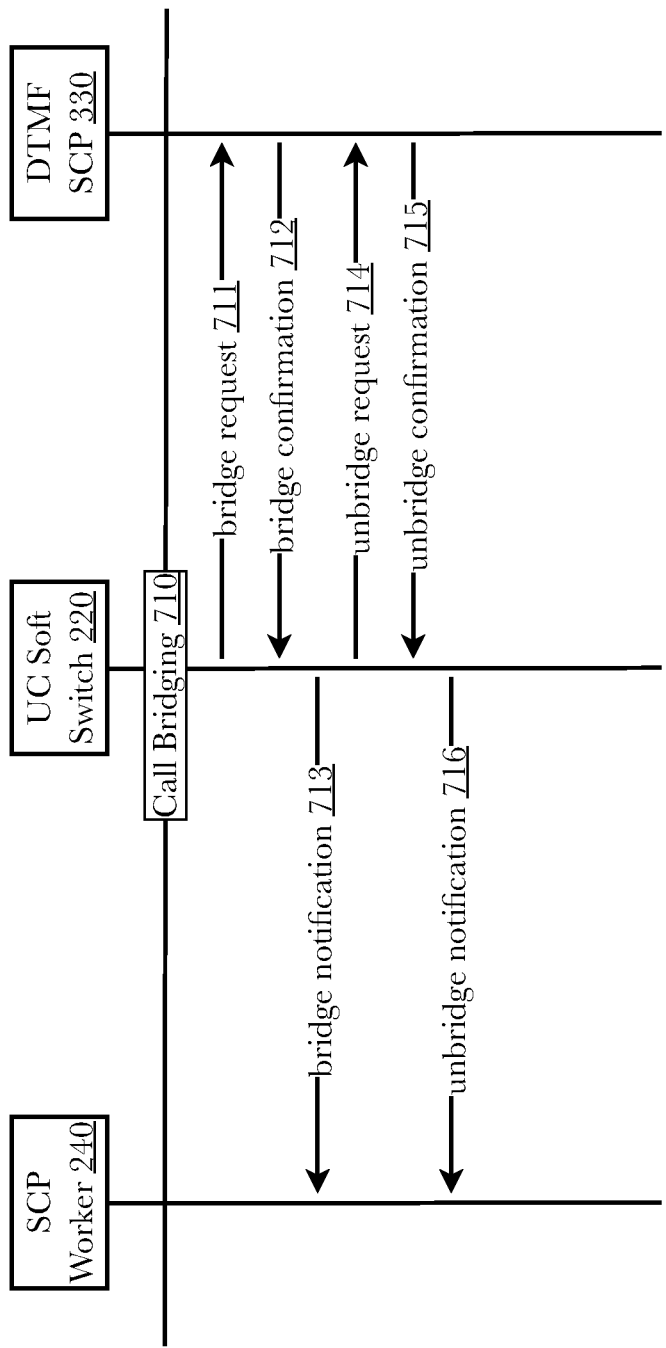
FIG. 7 is a messaging diagram illustrating an exemplary messaging sequence for bridging calls for a secure data entry system.

FIG. 7 is a messaging diagram illustrating an exemplary messaging sequence for bridging calls for a secure data entry system. A call bridging sequence 710 is initiated when softswitch 320 sends a bridge request 711 to DTMF secure call platform 330, which responds by bridging the call and sending a bridged call confirmation 712 to softswitch 320. Softswitch 320 sends a bridged call notification 713 to secure call platform worker 240. Likewise, a call unbridging sequence is initiated when softswitch 320 sends an unbridge request 714 to DTMF secure call platform 330, which responds by bridging the call and sending a bridged call confirmation 715 to softswitch 320. Softswitch 320 sends a bridged call notification 716 to secure call platform worker 240.

Figure 8:
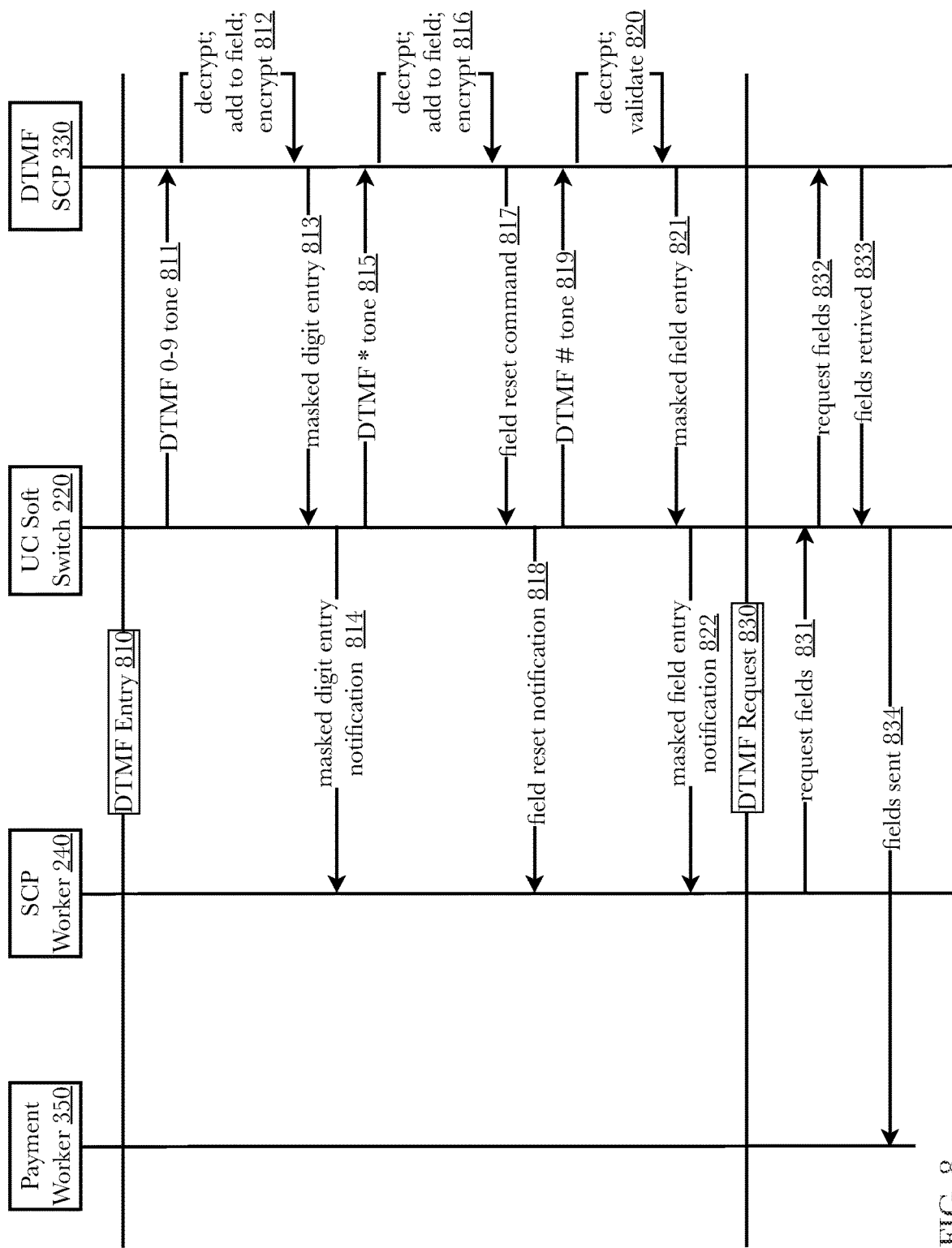
FIG. 8 is a messaging diagram illustrating an exemplary messaging sequence for secure processing of DTMF tones for a secure data entry system.

FIG. 8 is a messaging diagram illustrating an exemplary messaging sequence for secure processing of DTMF tones for a secure data entry system. A DTMF entry sequence 810 is initiated when softswitch 320 sends a DMTF tone 811 to DTMF secure call platform 330, which decrypts the tone into a digit, adds the digit to a field, and encrypts the field 812, sending a masked digit entry 813 to softswitch 320. Softswitch 320 sends a masked digit entry notification 814 to secure call platform worker 240.

If the DTMF tone is the "*" tone 815, DTMF secure call platform 330 decrypts the tone, empties the field, and encrypts the field 816, and sends a field reset command 817 to softswitch 320. Softswitch 320 sends a field reset notification 818 to secure call platform worker 240.

If the DTMF tone is the "#" tone 819, DTMF secure call platform 330 decrypts the tone, validates the field 820, and sends a masked field entry 821 to softswitch 320. Softswitch 320 sends a masked field entry notification 822 to secure call platform worker 240.

A DTMF request sequence 830 is initiated when secure call platform worker 240, upon receipt of the masked field entry notification 822, sends requests fields 831 to softswitch 320, which in turn requests fields 832 from DTMF secure call platform 330. DTMF secure call platform 330 retrieves the fields and sends them 833 to softswitch 320 which sends the fields 834 to secure call platform worker 240.

Figure 9:
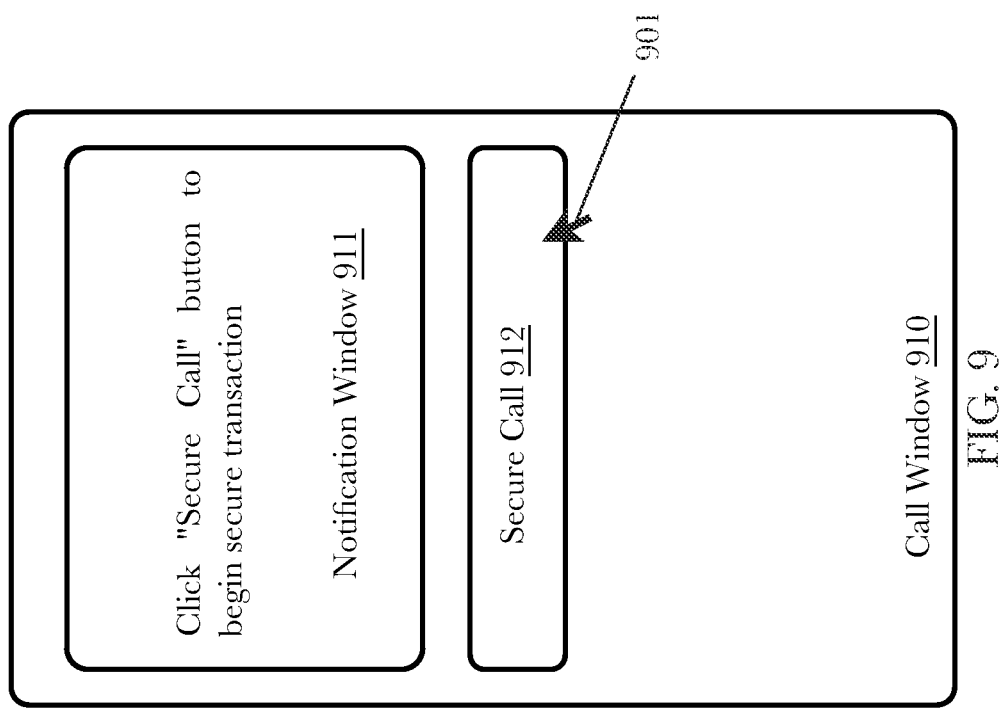
FIGS. 9-12 are exemplary screenshots showing a representative's interface during a secure data entry session.
Figure 10:
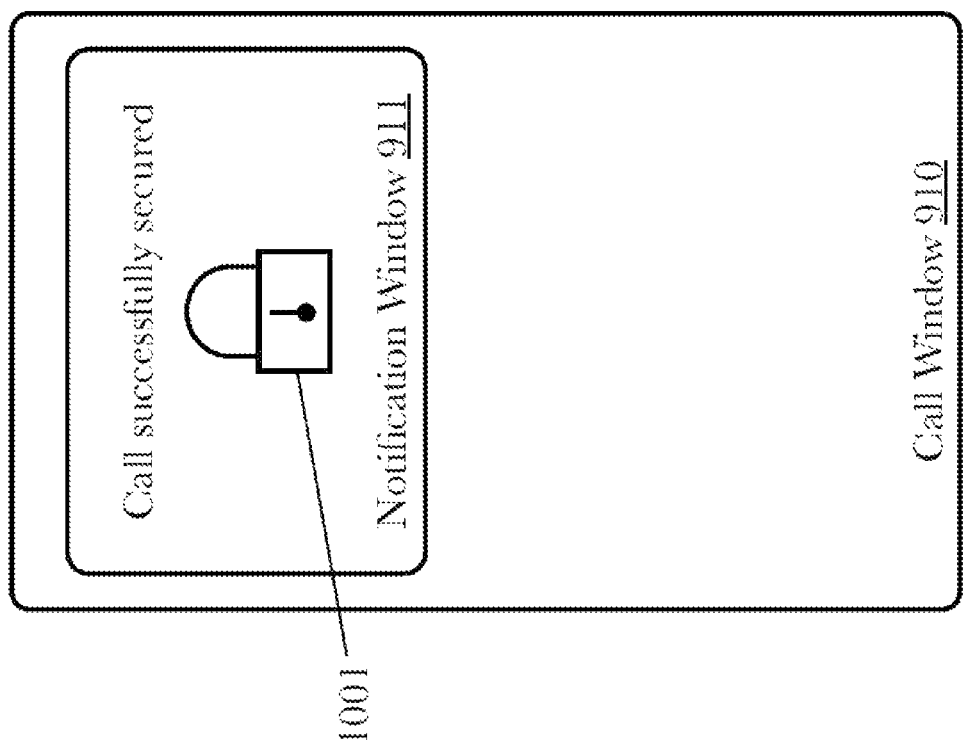
Figure 11:
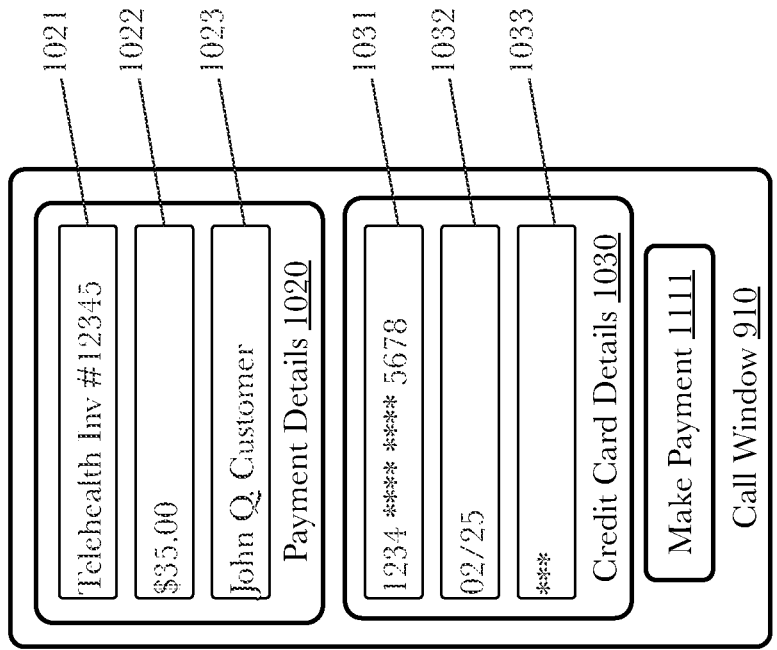
Figure 12:
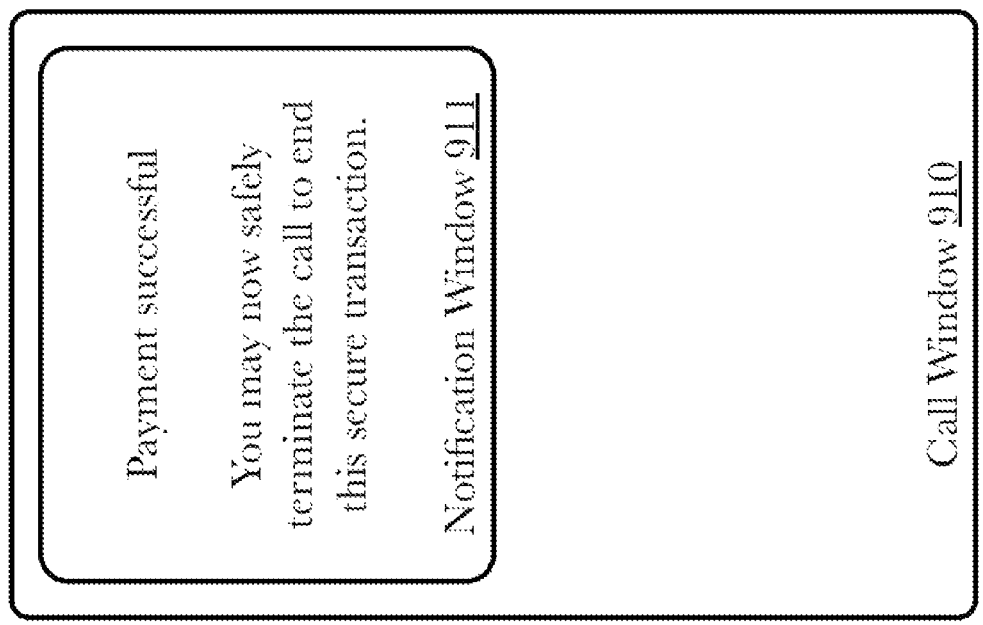

FIGS. 9-12 are exemplary screenshots showing a representative's interface during a secure data entry session. In FIG. 9, the call window 910 seen by the representative shows a notification window 911 which instructs the representative to click on a "secure call" button 912 to begin a secure transaction. When the representative clicks on the secure call button 912 using a pointer 901, the call is secured via a secured, bridged call as described above. In FIG. 10, the notification window now displays a lock symbol 1001 with a message to the representative that the call has been successfully secured. In FIG. 11, the call window now displays a payment details window 1020, a credit card details window 1030, and a make payment button 1111. The representative fills in the payment details fields comprising a transaction description 1021, an amount 1022, and the name of the customer 1023 while the customer is still on the phone. At this point, the representative requests that the customer enter DTMF tones on his or her touchtone keypad for each of the indicated fields, in this example a credit card number field 1031, an expiration date field 1032, and a card verification value (CCV) field 1033. As the customer enters the DTMF tones for each digit, the system intercepts the tones, decrypts them, and enters them into the fields 1031-1033 masked by asterisks so that the representative neither hears the tones nor sees the masked digits (in this example not all of the digits are masked). When the credit card details fields 1031-1033 are completed, the representative clicks on the make payment button 1111, and the system processes the payment through a secure payment application 351. FIG. 12 shows the completion of the secure data entry process with the notification window 911 advising the representative that the payment was successful and that the call can be safely terminated, if appropriate.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 13:
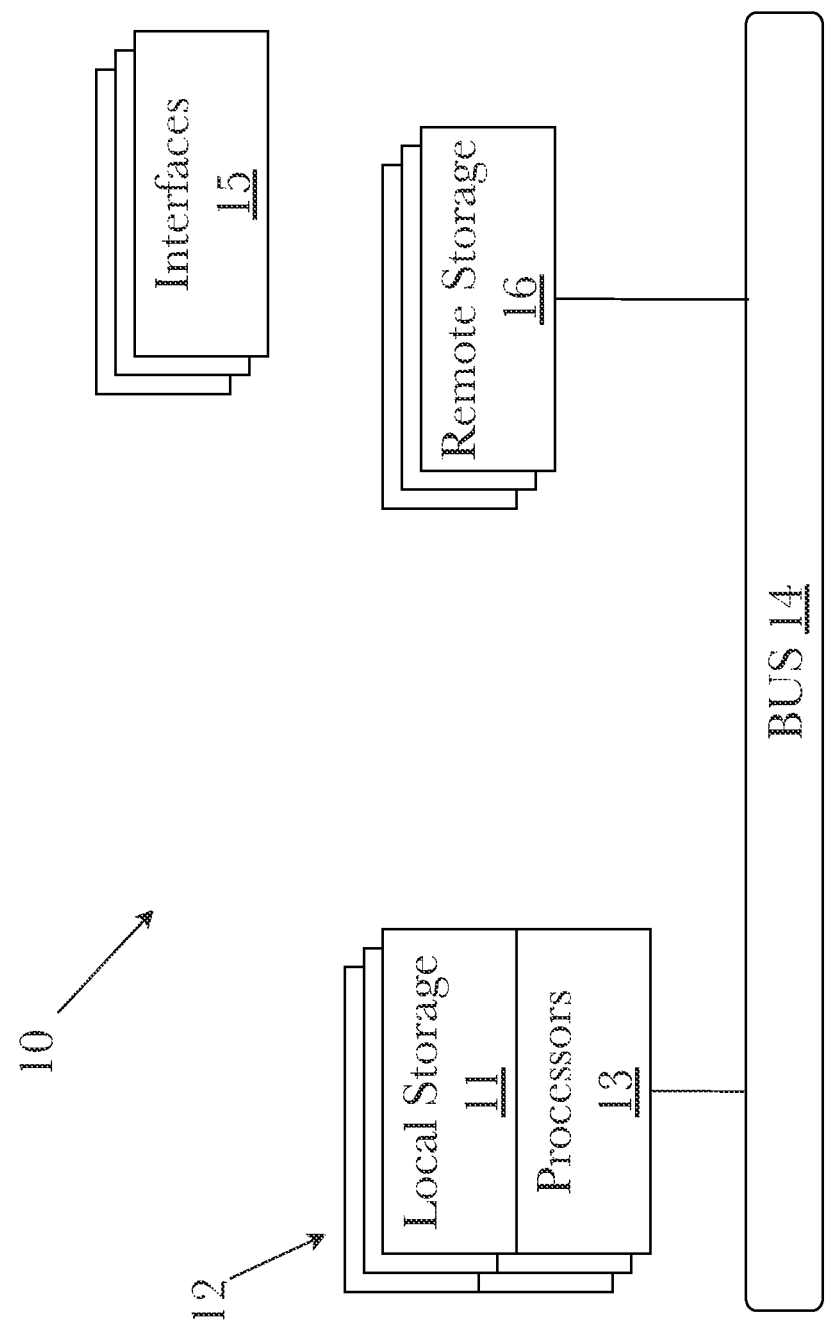
FIG. 13 is a block diagram illustrating an exemplary hardware architecture of a computing device.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 13 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
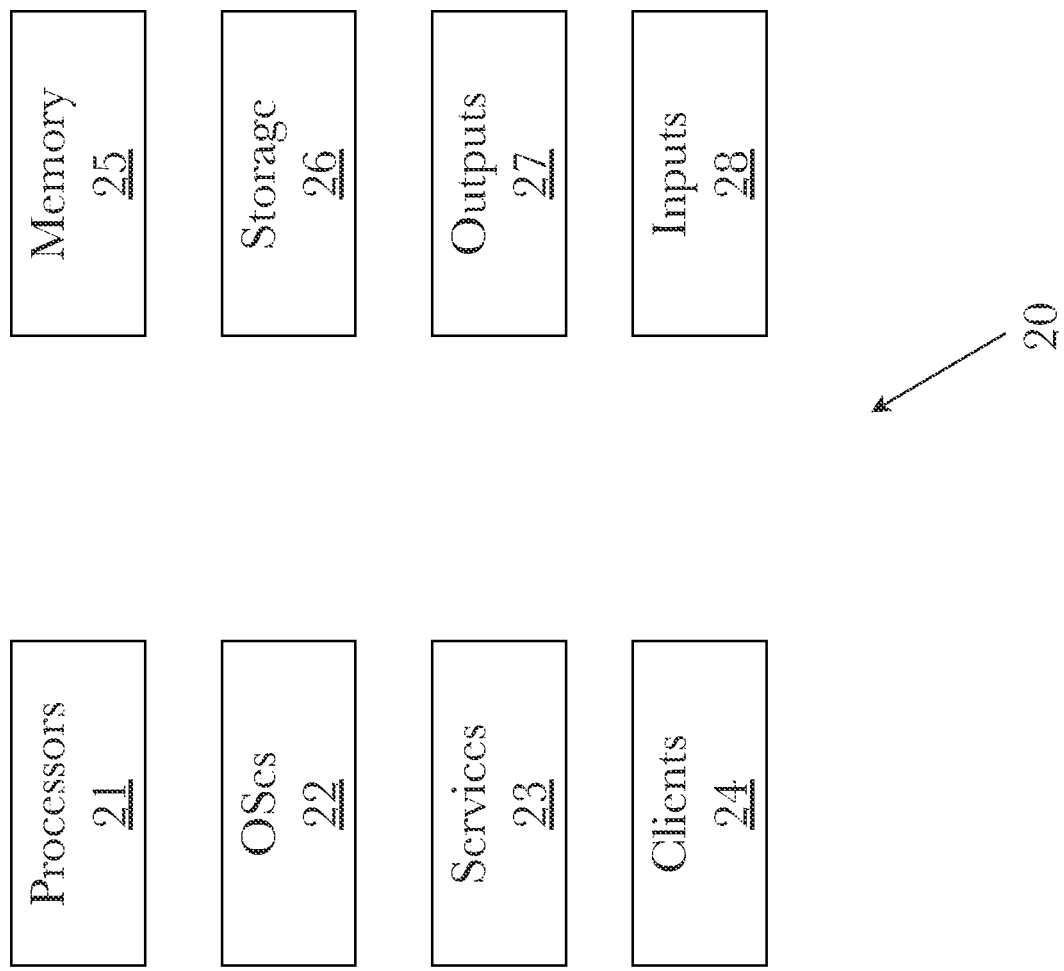
FIG. 14 is a block diagram illustrating an exemplary logical architecture for a client device.

In some aspects, systems may be implemented on a standalone computing system. Referring now to FIG. 14, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 15:
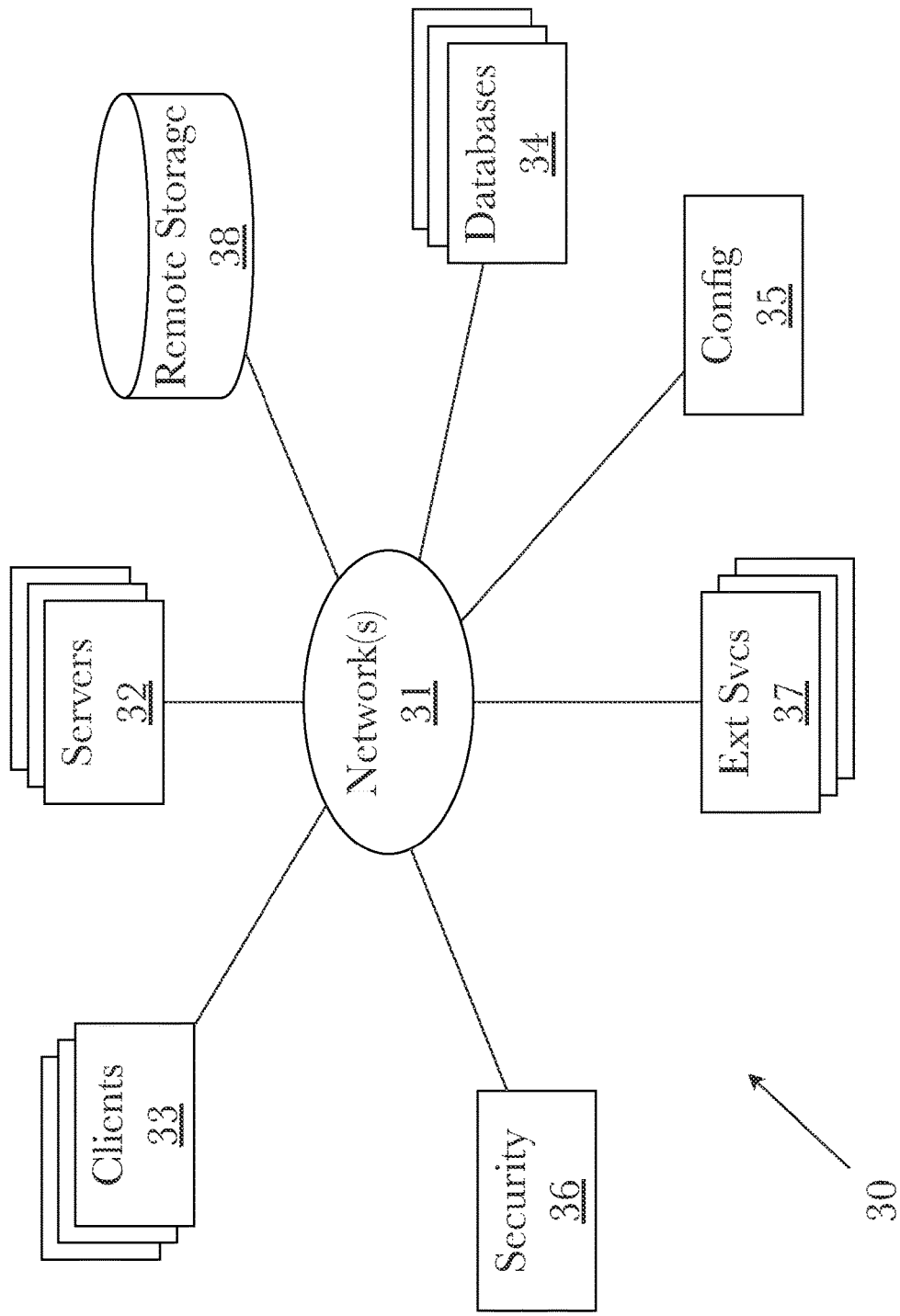
FIG. 15 is a block diagram showing an exemplary architectural arrangement of clients, servers, and external services.

In some aspects, systems may be implemented on a distributed computing network, such as one having any number of clients and/or servers. Referring now to FIG. 15, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system or approach is specifically required by the description of any specific aspect.

Figure 16:
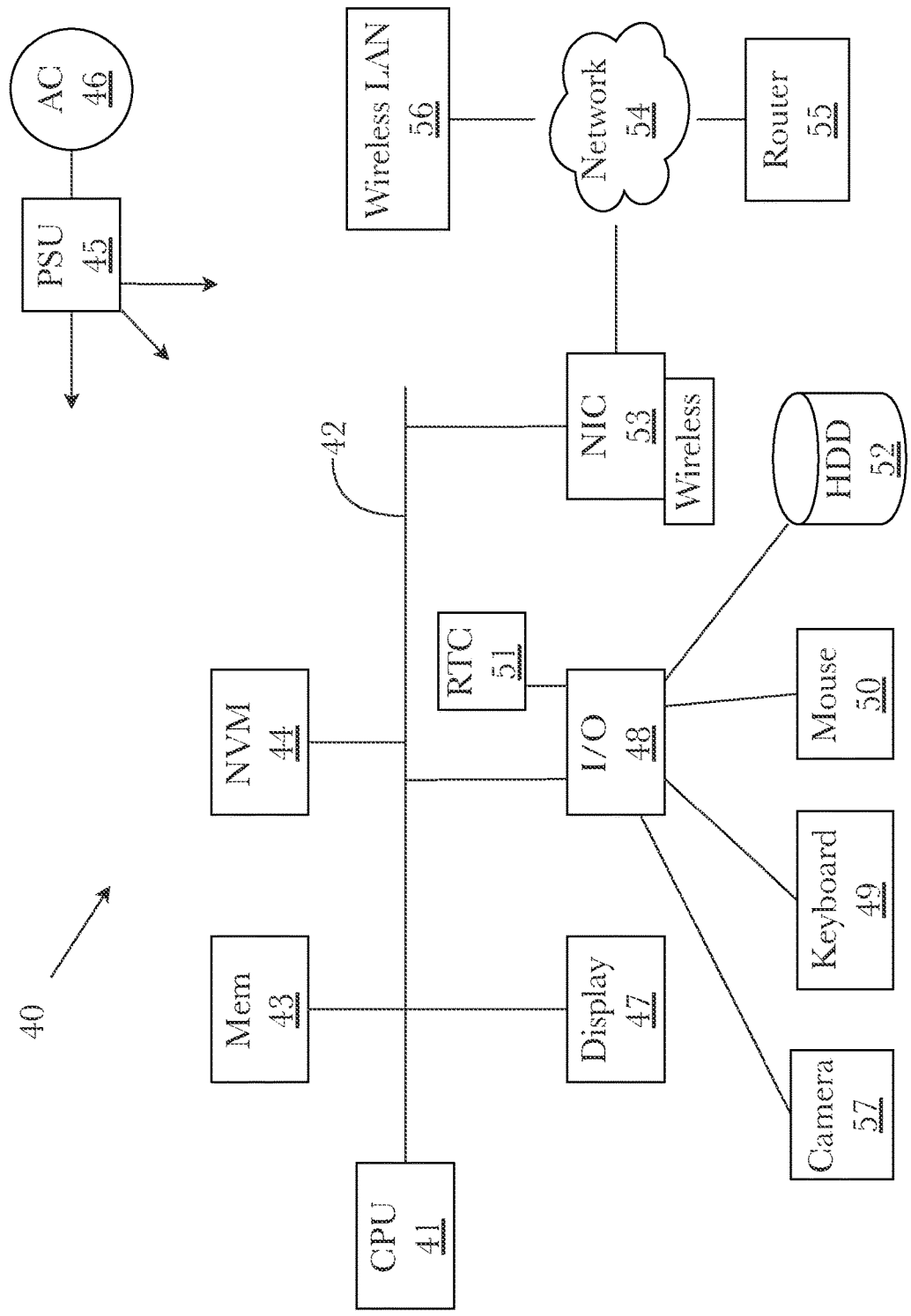
FIG. 16 is another block diagram illustrating an exemplary hardware architecture of a computing device.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A microservice-based system for on-demand secure data entry for representative-assisted calls, comprising:
    a computing device comprising a memory, a processor, and a non-volatile data storage device;
    a messaging broker operating on the computing device, the messaging broker comprising a first plurality of programming instructions stored in the memory which, when operating on the processor, causes the computing device to coordinate the operation of a plurality of microservices via messaging, each of the microservices comprising a cloud-based service providing telephony functionality, and wherein the plurality of microservices comprises:
        a dialed number identification service (DNIS) pool worker microservice, comprising a DNIS pool comprising one or more phone numbers, the DNIS pool worker microservice providing the following telephony functionality:
            allocate phone numbers from the DNIS pool;
            validate system-to-representative calls; and
            validate system-to-customer calls;
        a session worker microservice providing the following telephony functionality:
            during an unsecured customer-to-representative call between a customer and merchant representative via a telephony system of the merchant's telecommunications carrier in a non-call-center environment controlled by the merchant, receive a request to establish a secured, bridged call wherein the customer and the merchant representative remain in voice communication with one another while payment information provided by customer is masked from the merchant representative;
            request a phone number allocation from the DNIS pool from a dialed number identification service (DNIS) pool worker;
            receive an allocated phone number from the DNIS pool by the DNIS pool worker; and
            instruct a dual-tone multi-frequency (DTMF) secure call platform to establish the secured, bridged call via a series of API calls to third-party control features of the telephony system of the merchant's telecommunications carrier; and
        the dual-tone multi-frequency (DTMF) secure call microservice operating in a payment card industry (PCI) compliant zone, the DTMF secure call microservice providing the following telephony functionality:
            receive the instructions to establish the secured, bridged call and the phone number allocation from the session worker;
            via a series of API calls to the telephony system of the merchant's telecommunications carrier, instruct the telephony system to:
                park the unsecured customer-to-representative call;
                place a system-to-representative call between the allocated phone number and the representative through a first softswitch;
                transfer the parked unsecured customer-to-representative call to the allocated phone number through a second softswitch to establish a system-to-customer call;
                bridge the system-to-representative call and the system-to-customer call via the allocated phone number;
            secure the system-to-representative call after receipt of validation of the system-to-representative call using a first DTMF secure call space;
            secure the system-to-customer call after receipt of validation of the system-to-customer call using a second DTMF secure call space;
            receive one or more dual-tone multi-frequency (DTMF) tones representing digits from zero to nine from the system-to-customer call; and
            using the first DTMF secure call space and second DTMF secure call space, block transmission of the DTMF tones to the system-to-representative call while passing through any other audio from the system-to-customer call to the system-to-representative call.

2. The system of claim 1, wherein the DTMF secure call microservice is further configured to:
    decrypt the received DTMF tones into the digits they represent;
    add the digits to a field; and
    transmit the field to a payment worker for processing by a secure payment application.

3. The system of claim 2, wherein the DTMF secure call microservice is further configured to:
    mask one or more of the digits in the field; and
    transmit the field with the masked digits to a representative interface via the system-to-representative call.

4. The system of claim 2, further comprising the representative interface operating on a second computing device which is configured to receive and display the field with the masked digits.

5. The system of claim 2, further comprising a secure border controller (SBC) microservice operating in the PCI compliant zone wherein the SBC acts as a call gateway securing a payment card industry (PCI) compliant zone.

6. A method for microservice-based on-demand secure data entry for representative-assisted calls, comprising the steps of:
    using a messaging broker operating on a computing device comprising a memory and a processor to coordinate the operation of a plurality of microservices via messaging, each of the microservices comprising a cloud-based service providing telephony functionality, wherein:
        the messaging broker is used to instruct a dialed number identification service (DNIS) pool worker microservice, comprising a DNIS pool comprising one or more phone numbers, the DNIS pool worker microservice to provide the following telephony functionality:
  allocate phone numbers from the DNIS pool;
  validate system-to-representative calls; and
  validate system-to-customer calls;
the messaging broker is used to instruct a session worker microservice to provide the following telephony functionality:
  during an unsecured call between a customer and merchant representative via a telephony system of the merchant's telecommunications carrier, receive a request to establish a secured, bridged call wherein the customer and the merchant representative remain in voice communication with one another while payment information provided by customer is masked from the merchant representative;
  request a phone number allocation from the DNIS pool from a dialed number identification service (DNIS) pool worker;
  receive an allocated phone number from the DNIS pool by the DNIS pool worker; and instruct a dual-tone multi-frequency (DTMF) secure call platform to establish the secured, bridged call via a series of API calls to the telephony system of the merchant's telecommunications carrier; and
the messaging broker is used to instruct the dual-tone multi-frequency (DTMF) secure call microservice operating in a payment card industry (PCI) compliant zone, the DTMF secure call microservice to provide the following telephony functionality:
  receive the instructions to establish the secured, bridged call and the phone number allocation from the session worker;
  via a series of API calls to the telephony system of the merchant's telecommunications carrier, instruct the telephony system to:
    park the unsecured customer-to-representative call;
    place a system-to-representative call between the allocated phone number and the representative through a first softswitch;
    transfer the parked unsecured customer-to-representative call to the allocated phone number through a second softswitch to establish a system-to-customer call;
    bridge the system-to-representative call and the system-to-customer call via the allocated phone number;
  secure the system-to-representative call after receipt of validation of the system-to-representative call using a first DTMF secure call space;
  secure the system-to-customer call after receipt of validation of the system-to-customer call using a second DTMF secure call space;
  receive one or more dual-tone multi-frequency (DTMF) tones representing digits from zero to nine from the system-to-customer call; and
  using the first DTMF secure call space and second DTMF secure call space, block transmission of the DTMF tones to the system-to-representative call while passing through any other audio from the system-to-customer call to the system-to-representative call.

7. The method of claim 6, further comprising the step of using the DTMF secure call microservice to:
  decrypt the received DTMF tones into the digits they represent;
  add the digits to a field; and
transmit the field to a payment worker for processing by a secure payment application.

8. The method of claim 7, further comprising the step of using the DTMF secure call microservice to:
  mask one or more of the digits in the field; and
transmit the field with the masked digits to a representative interface via the system-to-representative call.

9. The method of claim 7, further comprising the steps of receiving and displaying the field with the masked digits on the representative interface which is operating on a second computing device.

10. The method of claim 7, further comprising the step of using a secure border controller (SBC) microservice operating in the PCI compliant zone as a call gateway securing payment card industry (PCI) compliant zone.

* * * * *